(12) United States Patent
Granja Junior et al.

(10) Patent No.: US 11,293,510 B2
(45) Date of Patent: Apr. 5, 2022

(54) ROLLING ELEMENT SPRING

(71) Applicant: Schaeffler Technologies AG & Co. KG, Herzogenaurach (DE)

(72) Inventors: Luiz Siqueira Granja Junior, Sorocaba (BR); Rudoniel Cury, Sao Paulo (BR); Marcelo Mariano Mariano Zavanella, Sorocaba (BR); Gustavo dos Santos Gioria, Sorocaba (BR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 179 days.

(21) Appl. No.: 16/865,996

(22) Filed: May 4, 2020

(65) Prior Publication Data

US 2020/0355234 A1 Nov. 12, 2020

Related U.S. Application Data

(60) Provisional application No. 62/845,545, filed on May 9, 2019.

(51) Int. Cl.
*F16F 1/34* (2006.01)
*F16F 1/42* (2006.01)
*F16C 19/08* (2006.01)

(52) U.S. Cl.
CPC ............... *F16F 1/34* (2013.01); *F16F 1/426* (2013.01); *F16C 19/08* (2013.01); *F16F 2232/08* (2013.01); *F16F 2234/02* (2013.01); *F16F 2236/04* (2013.01)

(58) Field of Classification Search
CPC ...... F16F 7/08; F16F 7/09; F16F 7/095; F16F 1/34; F16F 1/426; F16F 2232/08; F16F 2234/02; F16F 2236/04; F16C 27/08; F16C 19/08; F16C 33/366; F16C 33/363; B62D 1/19
See application file for complete search history.

(56) References Cited

U.S. PATENT DOCUMENTS

| | | | | |
|---|---|---|---|---|
| 3,382,955 A * | 5/1968 | Deyerling | ................. | F16F 7/09 188/129 |
| 4,674,725 A * | 6/1987 | Popper | ...................... | F16F 7/00 188/380 |
| 5,197,573 A * | 3/1993 | De La Fuente | ........... | F16F 7/02 188/129 |
| 5,755,192 A | 5/1998 | Brevick | | |
| 6,412,606 B1 * | 7/2002 | Wu | ........................ | F16F 7/082 188/266 |

(Continued)

FOREIGN PATENT DOCUMENTS

| | | | | |
|---|---|---|---|---|
| DE | 3336862 A1 * | 8/1984 | ............. | D06F 37/20 |
| DE | 4203448 A1 * | 8/1993 | ........... | F16H 7/0834 |
| WO | WO-2019021797 A1 * | 1/2019 | ............ | F16F 9/3271 |

*Primary Examiner* — Melanie Torres Williams

(57) ABSTRACT

A spring configured to compress, expand, and provide a force is provided that includes a first ring, a second ring, a third ring, a first plurality of rolling elements arranged between the first and second rings, and a second plurality of rolling elements arranged between the first and third rings. When the spring is compressed, the first ring is configured to be elastically deformed in tension in a radially outwardly direction, and the second and third rings are configured to be elastically deformed in compression in a radially inwardly direction.

20 Claims, 8 Drawing Sheets

(56) References Cited

U.S. PATENT DOCUMENTS

| | | |
|---|---|---|
| 9,745,893 B2 | 8/2017 | Brevick |
| 9,957,886 B2 | 5/2018 | Brevick |
| 2009/0121399 A1* | 5/2009 | Hindle .................. F16F 15/005 267/140.15 |

* cited by examiner

ROLLING ELEMENT SPRING

CROSS-REFERENCE TO RELATED APPLICATIONS

This application claims the benefit under 35 U.S.C. § 119(e) of U.S. Provisional Application No. 62/845,545 filed on May 9, 2019, which is incorporated herein in its entirety by reference.

TECHNICAL FIELD

Example aspects described herein relate to a spring utilized within an internal combustion engine.

BACKGROUND

Springs can be used in many applications to provide a vital force required for function. Some applications require exceedingly high spring forces within a small packaging space.

SUMMARY

An example embodiment of a spring is provided that includes a first ring, a second ring, a third ring, a first plurality of rolling elements, and a second plurality of rolling elements. At least a portion of the second ring is disposed or nested within the first ring. At least a portion of the third ring is disposed or nested within the first ring. The first plurality of rolling elements is arranged between the first ring and the portion of the second ring that is disposed within the first ring. The second plurality of rolling elements is arranged between the first ring and the portion of the third ring that is disposed within the first ring.

In an example embodiment, one or both of the first and second pluralities of rolling elements are balls. In one aspect, four contact zones of the balls are defined by an inner raceway of one or both of the second and third rings, and an outer raceway of the first ring.

A first pathway for the first plurality of rolling elements can be non-parallel to a second pathway for the second plurality of rolling elements. When the spring is compressed from a first height to a smaller second height, the first plurality of rolling elements can be configured to move toward the second plurality of rolling elements. In another aspect, a gap that is formed between second and third rings decreases when the spring is compressed from a first height to a smaller second height.

In an example embodiment, the first ring is configured with a first conical portion and a second conical portion. The first conical portion has at least one raceway that engages the first plurality of rolling elements, and the second conical portion has at least one raceway that engages the second plurality of rolling elements. In one aspect, the spring includes a cage that is arranged between the first ring and the second ring, with the cage configured to receive the first plurality of rolling elements.

In an example embodiment, compressing the spring: i) moves the first plurality of rolling elements to radially expand the first ring and radially compress the second ring; and, ii) moves the second plurality of rolling elements to radially expand the first ring and radially compress the third ring.

In one aspect, contact lines of the first plurality of rolling elements and contact lines of the second plurality of rolling elements form an O-arrangement.

In another aspect: the first ring is configured with a first raceway to engage the first plurality of rolling elements and a second raceway to engage the second plurality of rolling elements; the second ring is configured with a third raceway to engage the first plurality of rolling elements; and, the third ring is configured with a fourth raceway to engage the second plurality of rolling elements. One or both of the first raceway and the second raceway could include a plurality of grooves. Furthermore, one or both of the third raceway and the fourth raceway could include a plurality of grooves.

An example embodiment of a piston for an internal combustion engine is provided that includes a central axis, a top portion, a bottom portion, and a spring. The top portion is configured to receive a force of combustion from the internal combustion engine, and the bottom portion forms a chamber with the top portion. The spring is arranged within the chamber and includes a first ring, a second ring, and a third ring. The first ring has a first conical portion and a second conical portion. The second ring engages the top portion of the piston. At least a portion of the second ring is disposed or nested within the first conical portion of the first ring. The third ring engages the bottom portion of the piston. At least a portion of the third ring is disposed or nested within the second conical portion of the first ring. A first diameter of the first conical portion is decreasing in magnitude in a first axial direction and a second diameter of the second conical portion is increasing in magnitude in the first axial direction. The second ring can have a third diameter decreasing in magnitude in the first axial direction, and the third ring can have a fourth diameter increasing in magnitude in the first axial direction.

In one aspect, the first ring further includes a first raceway that is arranged on the first conical portion and a second raceway that is arranged on the second conical portion. The second ring includes a third raceway and the third ring includes a fourth raceway. The first plurality of rolling elements engages the first and third raceways and the second plurality of rolling elements engages the second and fourth raceways. A cage can be arranged between the first ring and the second ring and is configured to receive the first plurality of rolling elements.

BRIEF DESCRIPTION OF THE DRAWINGS

The above mentioned and other features and advantages of the embodiments described herein, and the manner of attaining them, will become apparent and better understood by reference to the following descriptions of multiple example embodiments in conjunction with the accompanying drawings. A brief description of the drawings now follows.

DETAILED DESCRIPTION OF THE EMBODIMENTS

Figure 1:
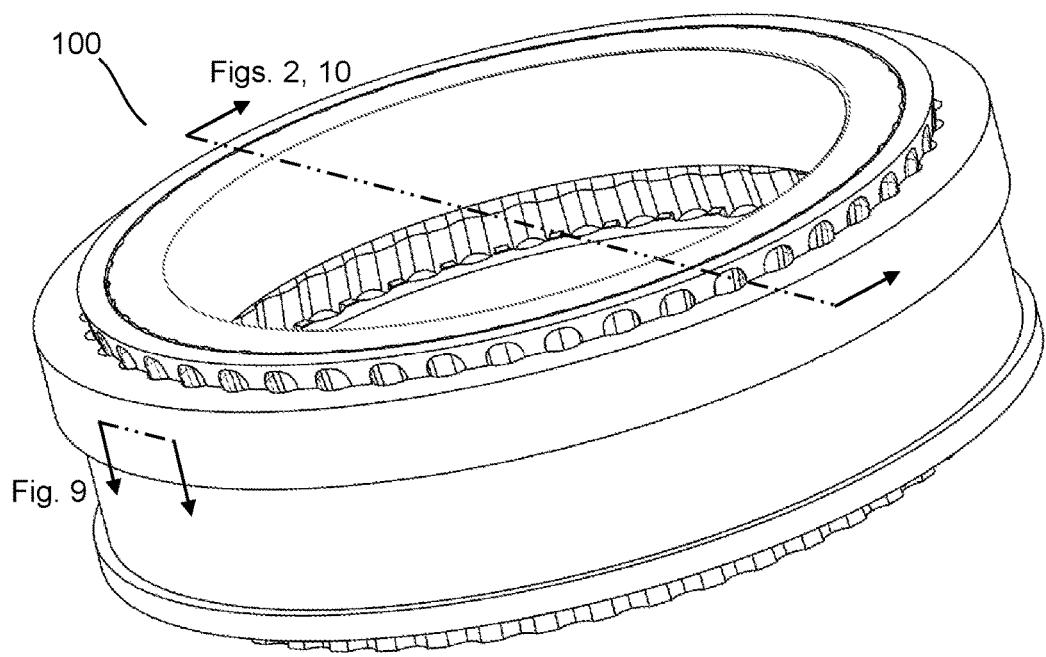
FIG. 1 is a perspective view of a rolling element spring.

Identically labeled elements appearing in different figures refer to the same elements but may not be referenced in the description for all figures. The exemplification set out herein illustrates at least one embodiment, in at least one form, and such exemplification is not to be construed as limiting the scope of the claims in any manner. Certain terminology is used in the following description for convenience only and is not limiting. The words "inner," "outer," "inwardly," and "outwardly" refer to directions towards and away from the parts referenced in the drawings. Axially refers to directions along a diametric central axis. Radially refers to directions that are perpendicular to the central axis. The words "left", "right", "up", "upward", "down", "downward", "top", and "bottom" can designate directions or locations in the drawings to which reference is made. The terminology includes the words specifically noted above, derivatives thereof, and words of similar import.

Figure 2:
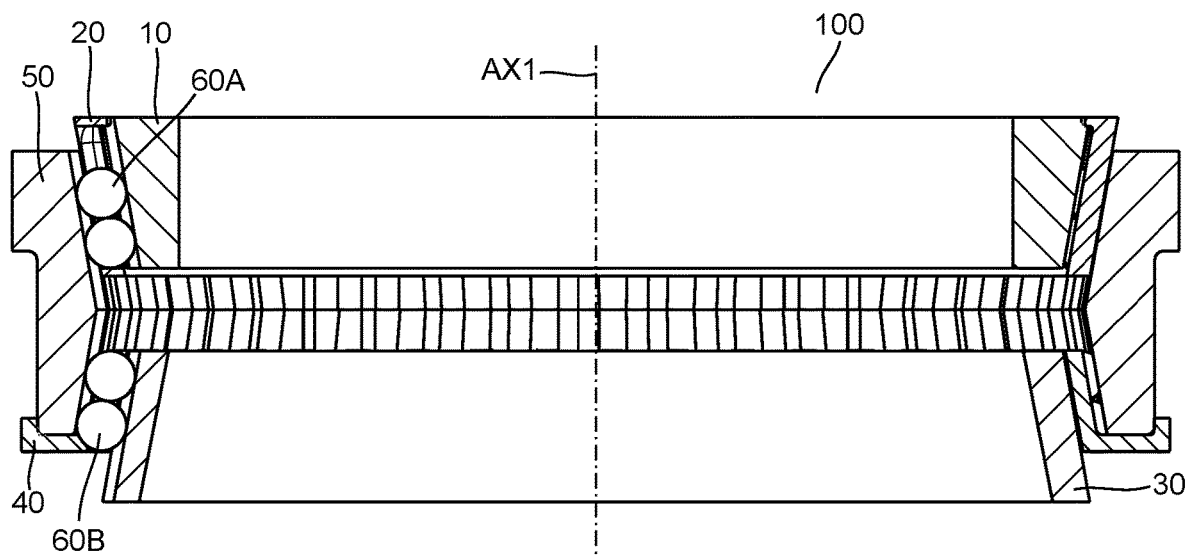
FIG. 2 is a cross-sectional view taken from FIG. 1.
Figure 3:
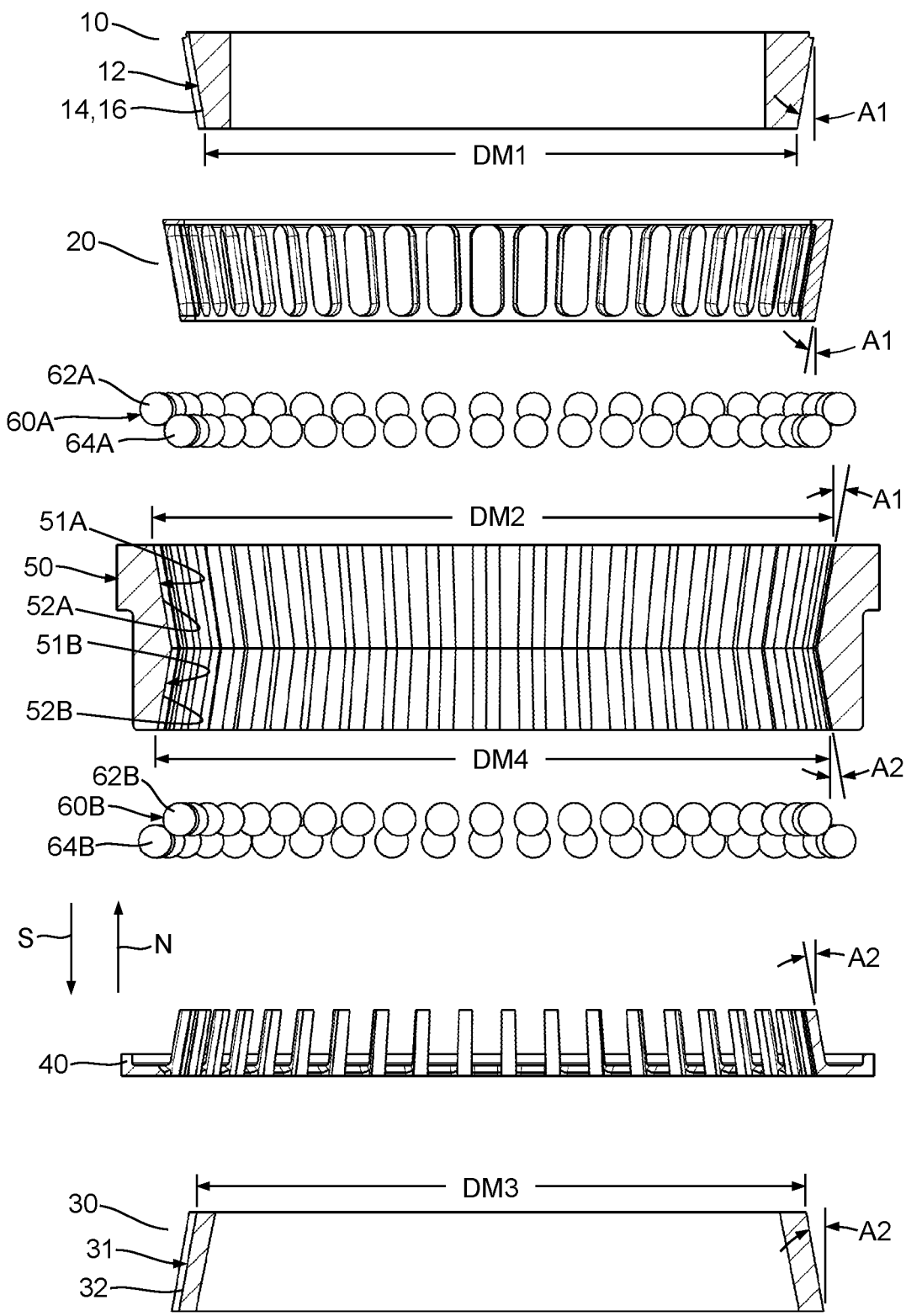
FIG. 3 is an exploded cross-sectional view of the rolling element spring of FIG. 1.
Figure 4:
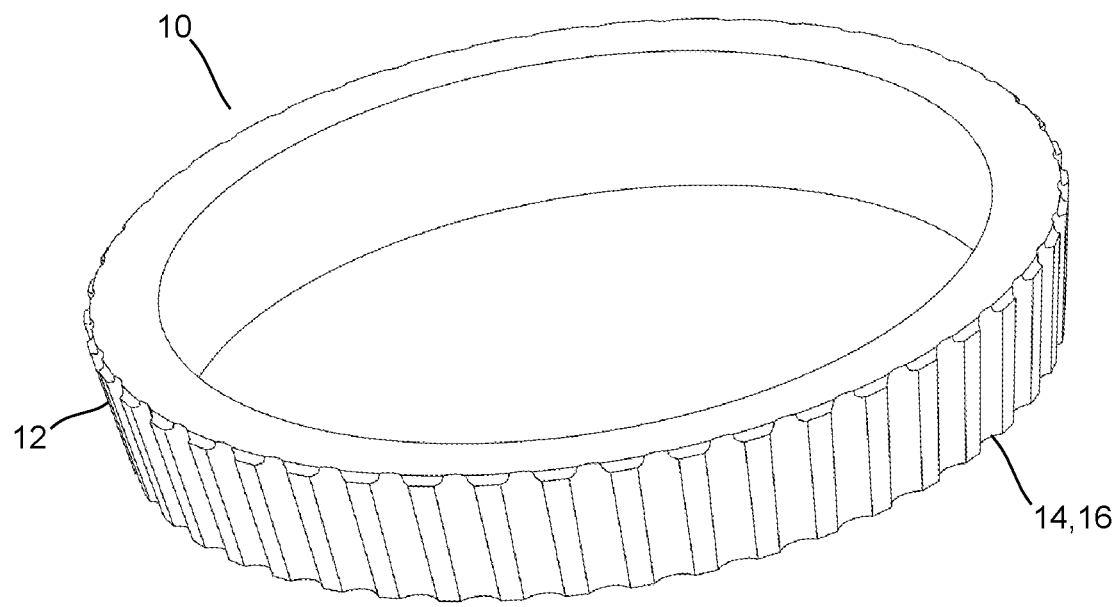
FIG. 4 is a perspective view of an example embodiment of a top inner ring utilized within the rolling element spring of FIG. 1.
Figure 5:
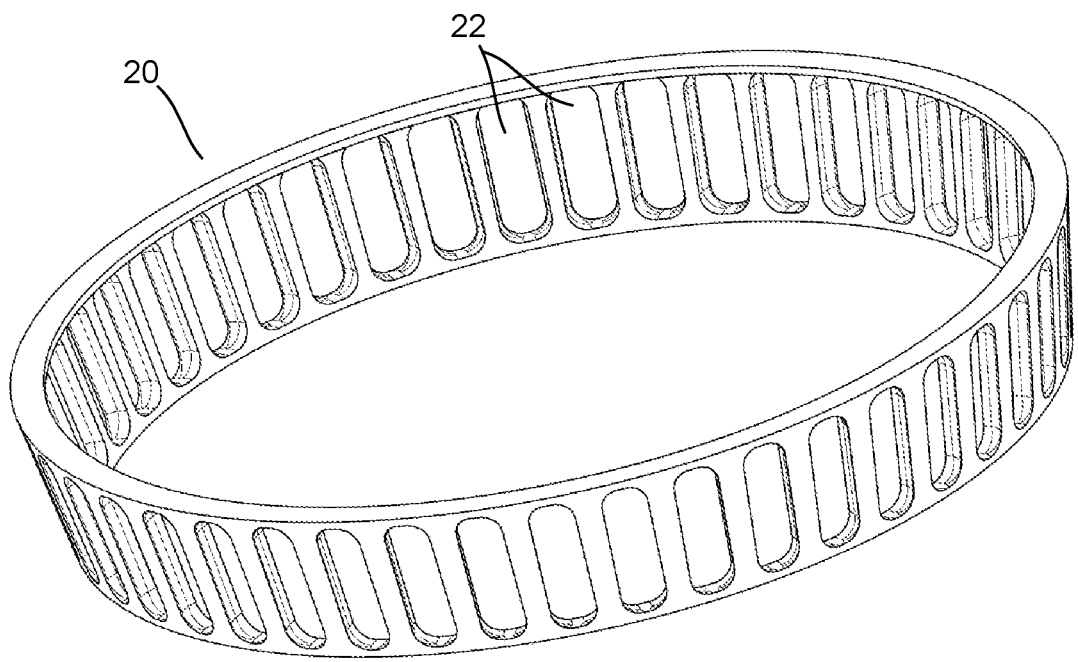
FIG. 5 is a perspective view of an example embodiment of a first cage utilized within the rolling element spring of FIG. 1.
Figure 6:
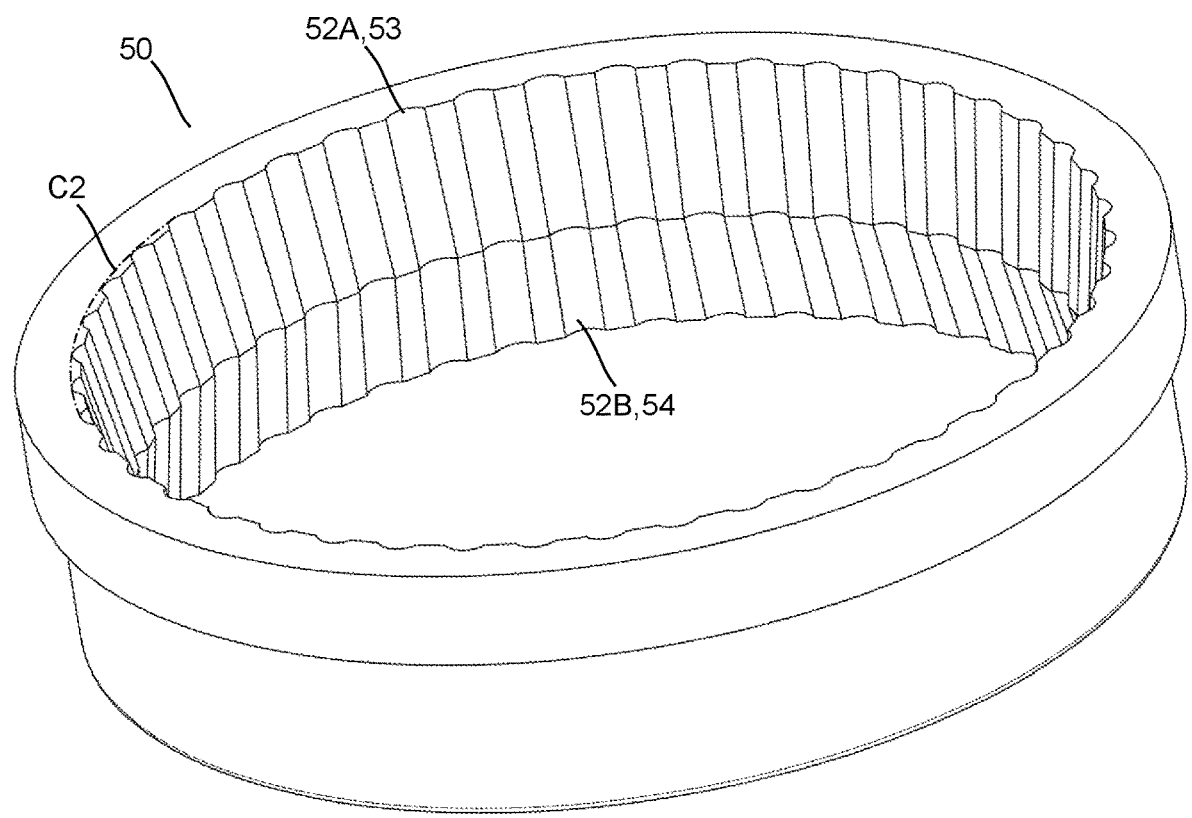
FIG. 6 is a perspective view of an example embodiment of an outer ring utilized within the rolling element spring of FIG. 1.
Figure 7A:
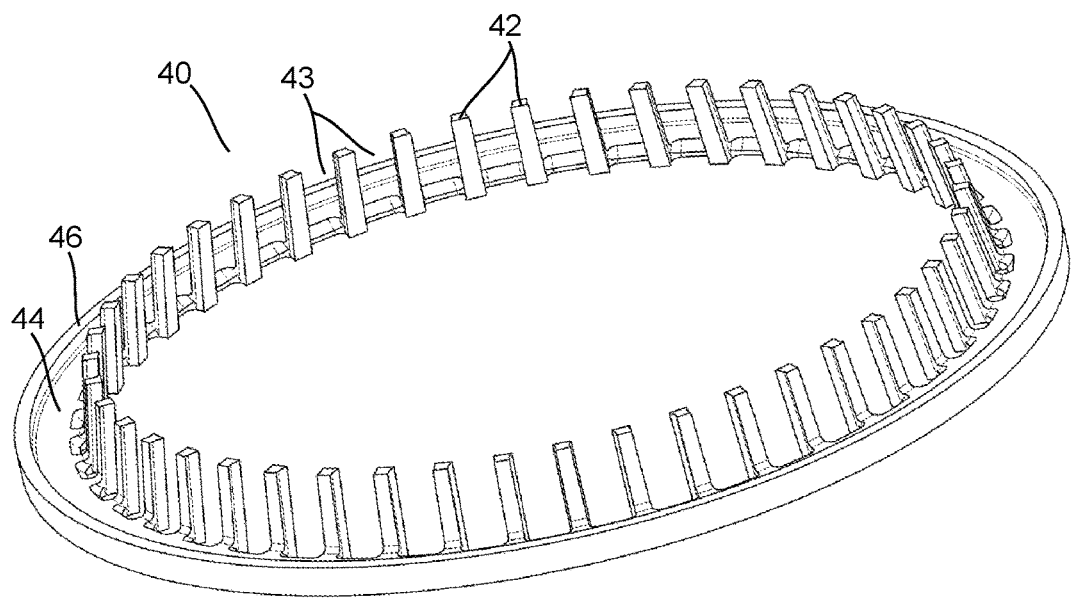
FIG. 7A is a perspective view of an example embodiment of a second cage utilized within the rolling element spring of FIG. 1.
Figure 7B:
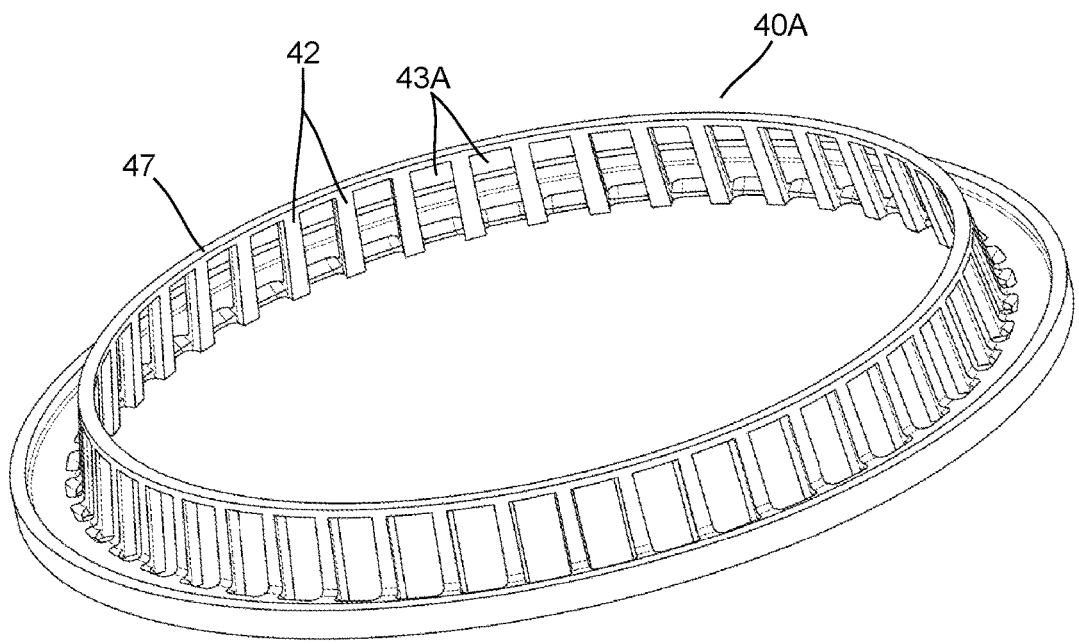
FIG. 7B is a perspective view of an example embodiment of a second cage that can be utilized within the rolling element spring of FIG. 1.
Figure 8:
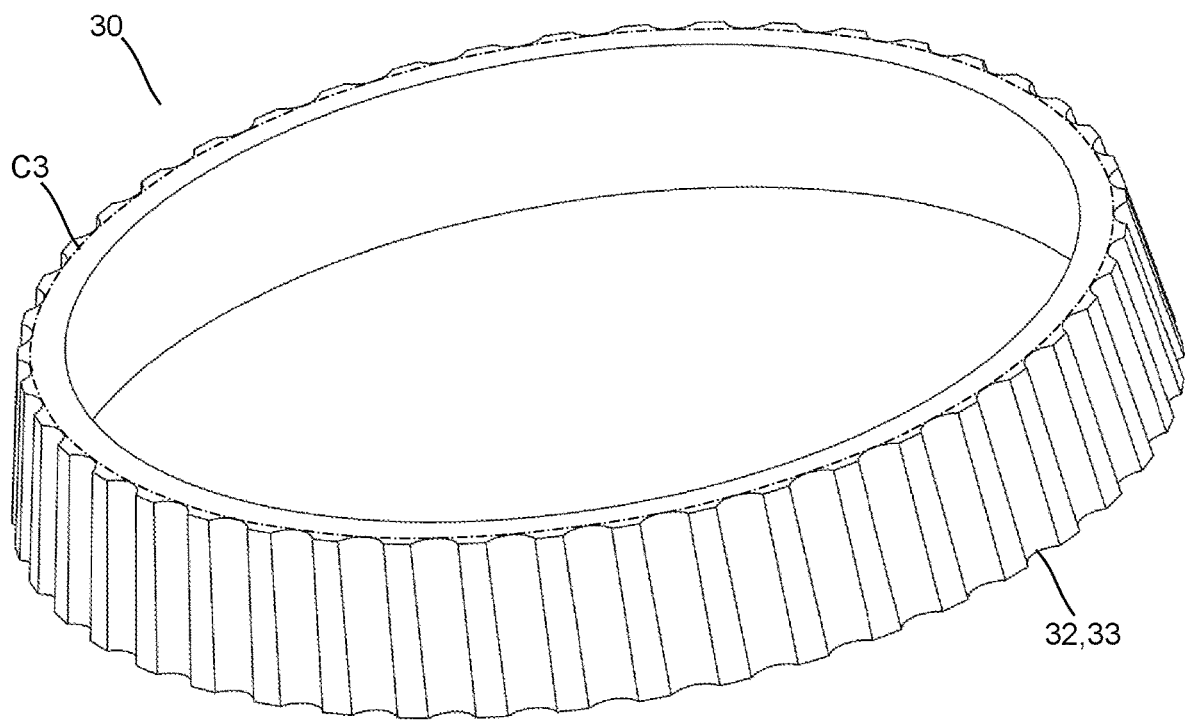
FIG. 8 is a perspective view of an example embodiment of a bottom inner ring utilized within the rolling element spring of FIG. 1.
Figure 9:
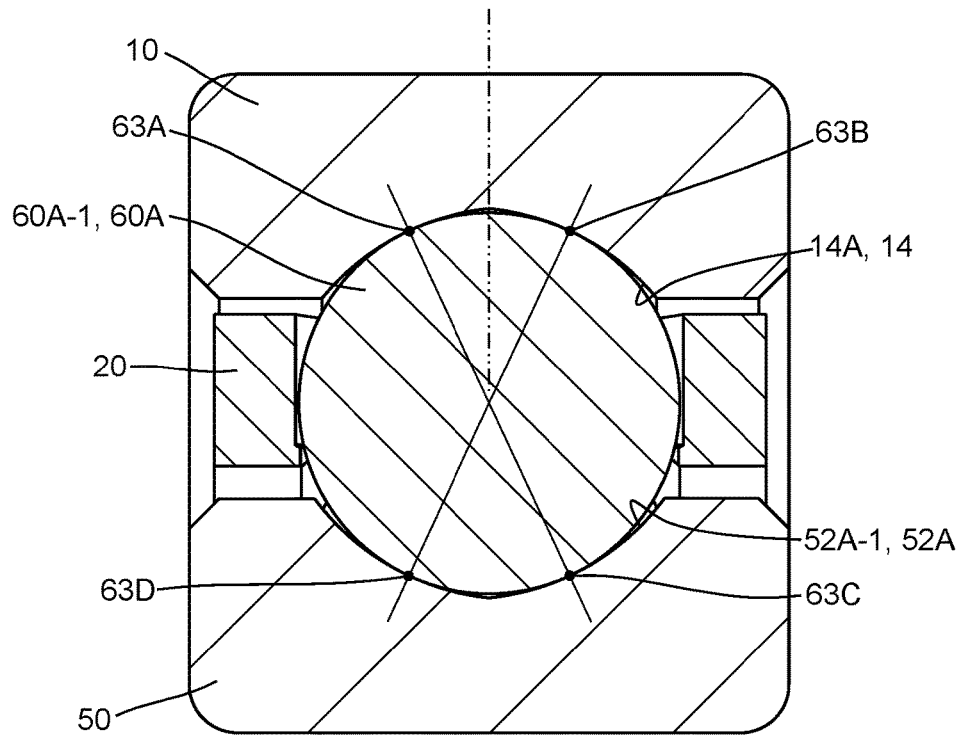
FIG. 9 is a partial cross-sectional view taken from FIG. 1 that shows four contact zones of one rolling element of a first plurality of rolling elements and respective raceway interfaces.
Figure 10:
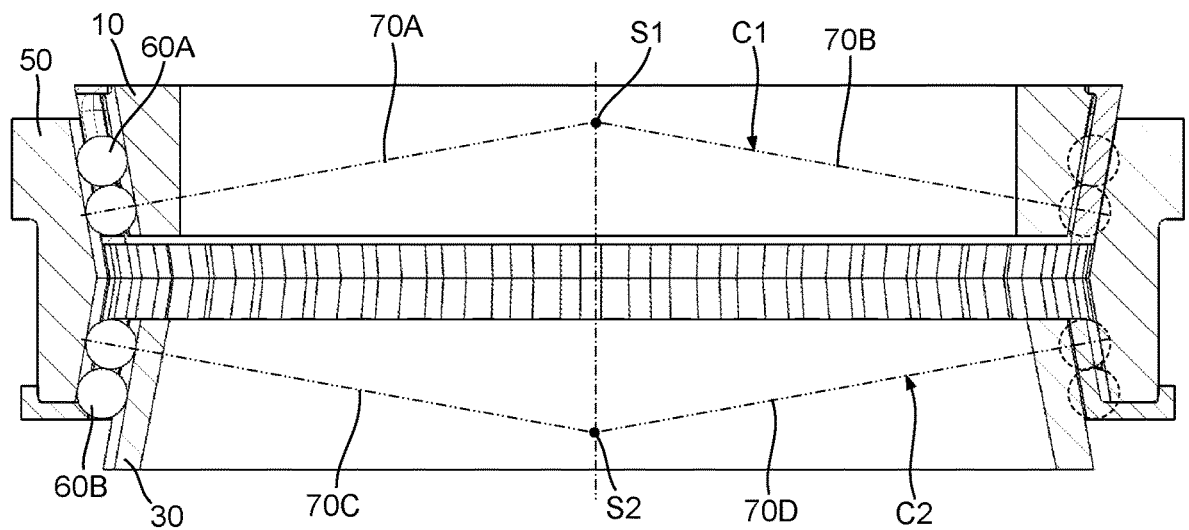
FIG. 10 is a cross-sectional view taken from FIG. 1 that shows an "O arrangement" of the rolling element spring.
Figure 11:
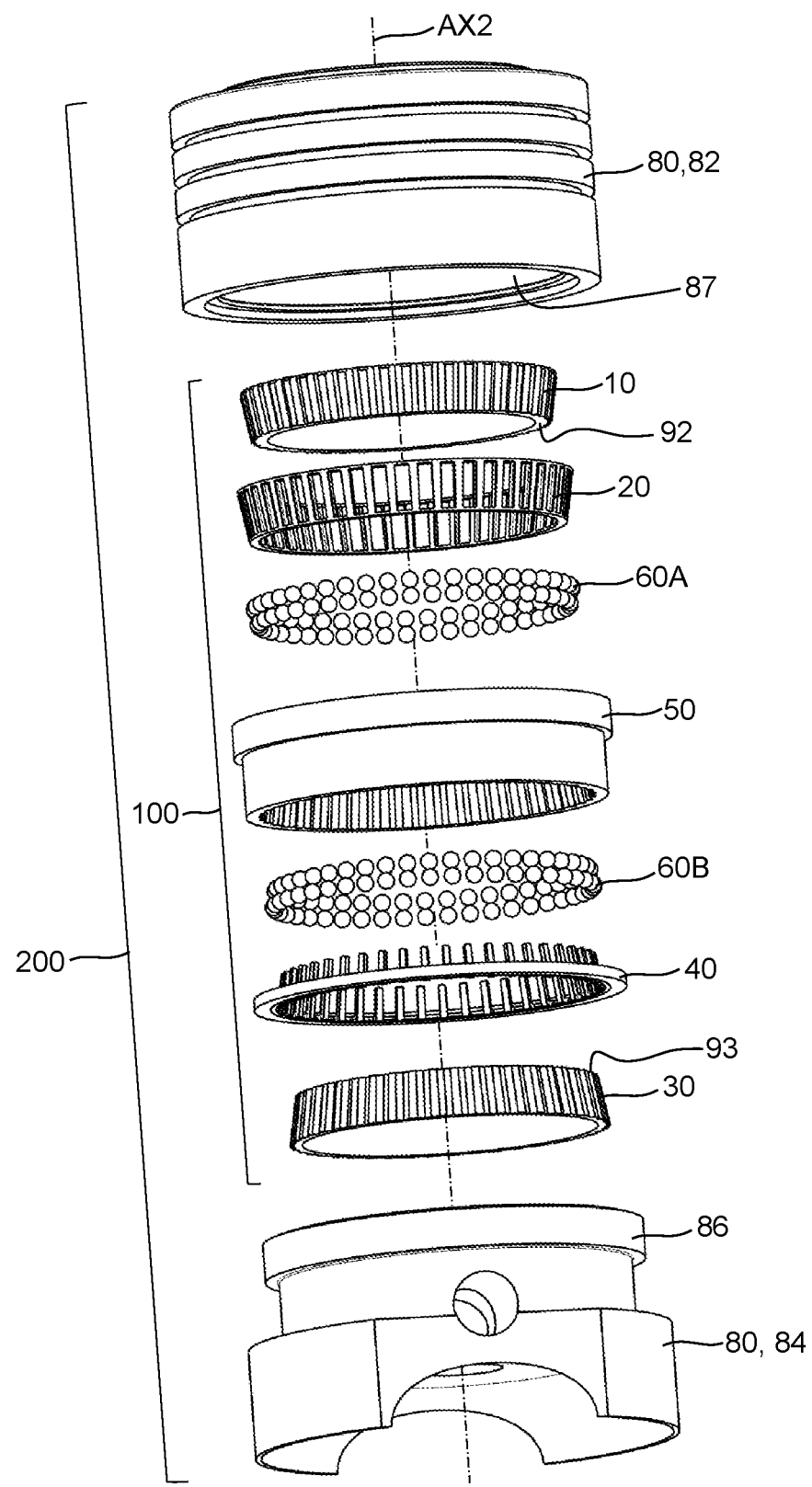
FIG. 11 is an exploded perspective view of the rolling element spring of FIG. 1 together with a piston.
Figure 12A:
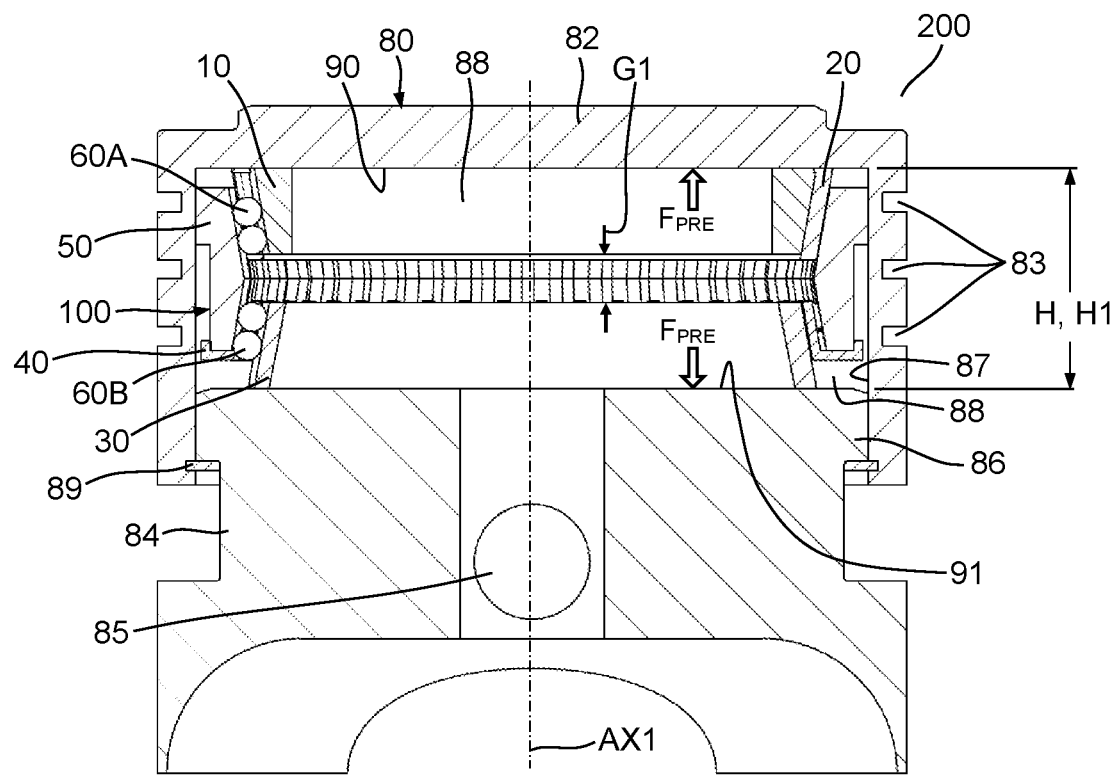
FIG. 12A is a cross-sectional view of the assembly of FIG. 11 in a first pre-loaded position.
Figure 12B:
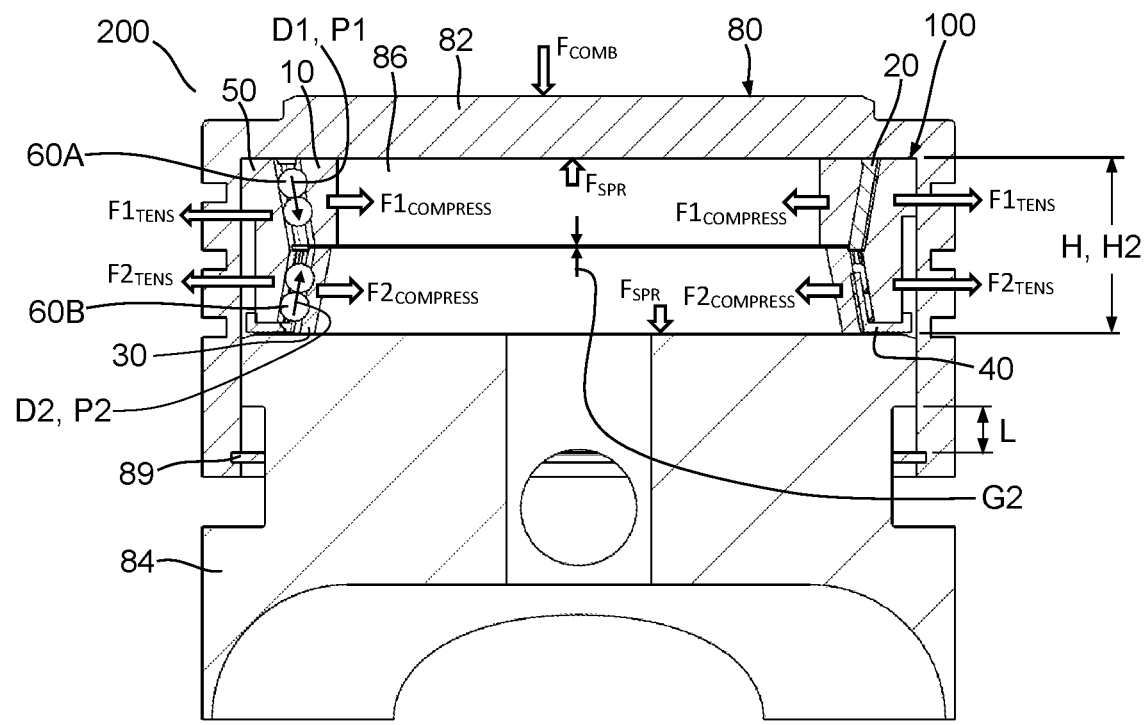
FIG. 12B is a cross-sectional view of the assembly of FIG. 11 in a second compressed position.

FIG. 1 shows a perspective view of an example embodiment of a rolling element spring 100. FIG. 2 shows a cross-sectional view taken from FIG. 1. FIG. 3 shows an exploded cross-sectional view of the rolling element spring 100. FIG. 4 shows a perspective view of an example embodiment of a top inner ring 10 utilized within the rolling element spring 100. FIG. 5 shows a perspective view of an example embodiment of a first cage 20 utilized within the rolling element spring 100. FIG. 6 shows a perspective view of an example embodiment of an outer ring 50 utilized within the rolling element spring 100. FIGS. 7A and 7B show perspective views of example embodiments of second cages 40, 40A that can be utilized within the rolling element spring 100. FIG. 8 shows a perspective view of an example embodiment of a bottom inner ring 30 utilized within the rolling element spring 100. FIG. 9 shows a partial cross-sectional view taken from FIG. 1 that shows four contact zones 63A-63D between one rolling element 60A-1 and a respective one top raceway 14A and one first upper raceway 52A-1. FIG. 10 shows a cross-sectional view taken from FIG. 1, defining an "O-arrangement" for the rolling element spring 100. FIG. 11 shows an exploded perspective view of the rolling element spring 100 together with a piston 80. FIG. 12A is a cross-sectional view of a piston and rolling element spring assembly 200 in a first pre-loaded position. FIG. 12B is a cross-sectional view of the piston and rolling element spring assembly 200 in a second compressed position. The following discussion should be read in light of FIGS. 1 through 12B.

The rolling element spring 100 includes a central axis AX1, the top inner ring 10, the bottom inner ring 30, the first cage 20, the second cage 40, a first plurality of rolling elements 60A, a second plurality of rolling elements 60B, and the outer ring 50. The top inner ring 10, bottom inner ring 30, first cage 20, second cage 40, and the outer ring 50 can be arranged concentrically. The top inner ring 10, as shown, is axially spaced apart from the bottom inner ring 30 such that no contact exists between them; furthermore, no portion of the top inner ring 10 overlaps the bottom inner ring 30, however, an overlapping configuration could be possible.

The top inner ring 10 includes a top conical portion 12 arranged at an angle A1 and configured with a plurality of top raceways 14 formed as grooves 16 to receive the first plurality of rolling elements 60A. A diameter DM1 of a circle that connects the base portions of the grooves 16, or alternatively stated, connects a radially inner extent of the plurality of the top raceways 14, is decreasing in magnitude moving in an axial direction S from top to bottom of the top inner ring 10.

The first cage 20 includes pockets 22 that receive the first plurality of rolling elements 60A. The first cage 20 is conical or tapered at the angle A1 for proper fitment between the top inner ring 10 and outer ring 50. It could be stated that the first cage 20 is nested within the outer ring 50 and that the top inner ring 10 is nested within the first cage 20. It could also be stated that the first cage 20 is arranged between outer ring 50 and the top inner ring 10. The first plurality of rolling elements 60A engage a plurality of first upper raceways 52A of the outer ring 50 and the plurality of top raceways 14 of the top inner ring 10 in four contact zones 63A-63D (as shown in FIG. 9), providing increased load capacity of the rolling element spring 100.

The outer ring 50 includes: i) an upper radial inner conical portion 51A arranged at angle A1 and configured with a plurality of first upper raceways 52A formed as grooves 53; and, ii) a lower radial inner conical portion 51B arranged at angle A2 and configured with a plurality of first lower raceways 52B formed as grooves 54. The angle A1 of the upper radial inner conical portion 51A (and the plurality of first upper raceways 52A) can be different or the same as the angle A2 of the lower radial inner conical portion 51B (and the plurality of first lower raceways 52B). A diameter DM2 of a circle C2 (a portion of the circle C2 is shown in FIG. 6) that connects the base portions of the grooves 53, or alternatively stated, connects a radially outer extent of the plurality of first upper raceways 52A, is decreasing in magnitude moving in an axial direction S from top to bottom of the outer ring 50. Furthermore, a diameter DM4 of a circle that connects the base portions of the grooves 54 is decreasing in magnitude moving in an axial direction N from bottom to top of the outer ring 50. It could be stated that the plurality of first upper raceways 52A and the plurality of first lower raceways 52B form a V-shape or that the plurality of first upper raceways 52A are separate and distinct from, and non-parallel to the plurality of first lower raceways 52B. With reference to the cross-sectional view of FIG. 3, an inner contour of the outer ring 50 could be described as hourglass in shape having a waistline that is smaller than the top and bottom portions of the inner contour of the outer ring 50.

The second cage 40 includes guide rails 42 that form pockets 43 that receive the second plurality of rolling elements 60B. The second cage 40 also includes a bottom rail 44 with a circumferential lip 46, both of which can receive a bottom of the outer ring 50. The second cage 40 is conical or tapered at angle A2.

FIG. 7B shows a further example embodiment of a second cage 40A that is arranged with pockets 43A having a top circumferential rail 47 to enclose the pockets 43A. The second cage 40 is radially positioned between the bottom inner ring 30 and the lower radial inner conical portion 51B of the outer ring 50. It could be stated that the second cage 40 is nested within the outer ring 50. The second plurality of rolling elements 60B extend radially inwardly and radially outwardly from the pockets 43A to engage the first lower raceway 52B and the bottom raceway 32 in four contact zones, similar to the four contact zones 63A-63D shown in FIG. 9.

The bottom inner ring 30 includes a bottom conical portion 31 arranged at angle A2 and configured with a plurality of bottom raceways 32 formed as grooves 33 to receive the second plurality of rolling elements 60B. It could be stated that the bottom inner ring 30 is nested within the second cage 40. The angle A2 of the bottom conical portion 31 of the bottom inner ring 30 can be different or the same as angle A1 of the top conical portion 12 of the top inner ring 10. A diameter DM3 of a circle C3 (circle C3 shown in FIG. 8) that connects the base portions of the grooves 33, or, alternatively stated, connects a radially inner extent of the plurality of bottom raceways, is increasing in magnitude moving in axial direction S from top to bottom of the bottom inner ring 30.

The first plurality of rolling elements 60A has a first row 62A and a second row 64A that are guided by the pockets 22 of the first cage 20, while extending radially inwardly and radially outwardly of from the pockets 22 to provide a rolling interface between the top inner ring 10 and the outer ring 50. Thus, the top inner ring 10 can be engaged with the outer ring 50 via the first plurality of rolling elements 60A. Likewise, the second plurality of rolling elements 60B has a first row 62B and a second row 64B that are guided by pockets 43 of the second cage 40 to provide a rolling interface between the bottom inner ring 30 and the outer ring 50. Thus, the bottom inner ring 30 can be engaged with the outer ring 50 via the second plurality of rolling elements 60B. Any number of rows of the first and second plurality of rolling elements 60A, 60B is possible, including a single row. Furthermore, all of the rolling elements shown in the figures are balls, however, any type of rolling element, such as a needle roller, cylindrical roller, or tapered roller, could be utilized.

As shown in the figures, the first row 62A and the second row 64A of the first plurality of rolling elements 60A are not separated within the pockets 22 of the first cage 20, thus, contact between these respective rows of rolling elements is possible. However, cross-members within the pockets 22 or individual pockets for each rolling element could be possible to prevent such contact. Likewise, the first row 62B and the second row 64B of the second plurality of rolling elements 60B are not separated within the pockets 43 of the second cage 40, thus, contact between these respective rows of rolling elements is also possible; and, cross-members within the pockets 43 or individual pockets for each rolling element could also be possible to prevent such contact.

FIG. 11 shows an exploded perspective view of the piston and rolling element spring assembly 200 together with a central axis AX2. FIG. 12A shows a cross-sectional view of the assembly of FIG. 11 in a first pre-loaded position. FIG. 12B shows a cross-sectional view of the assembly of FIG. 11 in a second compressed position. The function of the rolling element spring 100 relative to the piston 80 will now be described.

The piston 80 includes a top portion 82 and a bottom portion 84. The top portion 82 directly receives a force of combustion $F_{COMB}$ that occurs during a power stroke within a 2-stroke or 4-stroke engine cycle of an internal combustion engine. The top portion can include grooves 83 that receive piston rings to seal the piston 80 to an inner wall of a cylinder of an internal combustion engine. The top portion 82 can also include an inner bore 87 that receives an upper land 86 of the bottom portion 84. The bottom portion 84 can include a connecting rod aperture 85 to facilitate a connection with a connecting rod of an internal combustion engine. The top portion 82 and bottom portion 84 form a chamber 88 with a height H that houses the rolling element spring 100.

As shown in FIG. 12A, the rolling element spring 100 provides a pre-load force $F_{PRE}$ that acts on a bottom side 90 of the top portion 82 and a top side 91 of the bottom portion 84 of the piston 80, such that is tries to separate the two portions 82, 84. A retaining ring 89 retains the assembly of the piston 80 together with the rolling element spring 100. FIG. 12A shows the first pre-loaded position of the piston 80 in which the bottom portion 84 is urged against the retaining ring 89 by the pre-load force $F_{PRE}$ of the rolling element spring 100. The first pre-loaded position is defined by: 1). a first gap G1 that is present between a bottom side 92 of the top inner ring 10 and a top side 93 of the bottom inner ring 30; and, 2). a first height H1 of the chamber 88 formed between the top portion 82 and the bottom portion 84.

FIG. 12B shows the second compressed position of the piston 80 in which a combustion force $F_{COMB}$ overcomes the pre-load force $F_{PRE}$ of the rolling element spring 100 to displace the top portion 82 downward relative to the bottom portion 84, and consequently changing a compression ratio of an internal combustion engine. In this second compressed position, the top portion 82 is displaced away from the retaining ring 89 by a distance L. The magnitude of distance L can vary and is determined by a magnitude of the combustion force $F_{COMB}$ relative to a provided spring force $F_{SPR}$ of the rolling element spring 100. The rolling element spring 100 can be designed to provide a spring force $F_{SPR}$ that can counteract a maximum combustion force $F_{COMB}$ provided by the internal combustion engine, maintaining a second gap G2 between the bottom side 92 of the top inner ring 10 and the top side 93 of the bottom inner ring 30, the second gap G2 smaller than the first gap G1. Thus, the rolling element spring 100 is designed so that the top inner ring 10 does not engage or overlap with the bottom inner ring 30. The distance L could be defined as the difference in magnitude between the first gap G1 and the second gap G2.

The spring force $F_{SPR}$ provided by the rolling element spring 100 can be achieved and manipulated by elastically deforming the outer ring 50 in tension in a radially outwardly direction and/or by elastically deforming one or both of the top inner ring 10 and the bottom inner ring 30 in compression in a radially inwardly direction. Alternatively stated, the spring force $F_{SPR}$ provided by the rolling element spring 100 can be achieved and manipulated by radial expansion of the outer ring 50 and/or radial compression or contraction of one or both of the top inner ring 10 and the bottom inner ring 30. Further details of the provided spring force $F_{SPR}$ now follows.

A first radial tensile force $F1_{TENS}$ on the outer ring 50 and a first radial compression force $F1_{COMPRESS}$ on the top inner ring 10 can be achieved by a downward displacement of the first plurality of rolling elements 60A in a first direction D1 along a first pathway P1 within the top raceway 14 (at angle A1) of top inner ring 10 and the first upper raceway 52A (at angle A1) of the outer ring 50. This displacement of the first plurality of rolling elements 60A in the first direction D1 is caused by a displacement of the top inner ring 10 in an axial direction S. Displacement of the top inner ring 10 in this direction moves the plurality of top raceways 14 such that a larger effective inner raceway diameter (defined by diameter DM1) converges toward a smaller effective outer raceway diameter (defined by diameter DM2) of the first upper raceways 52A. This convergence, and the magnitude thereof, directly affects a magnitude of the first radial tensile force $F1_{TENS}$ acting on the upper radial inner conical portion 51A of the outer ring 50 and the first radial compression force $F1_{COMPRESS}$ acting on the top inner ring 10. Therefore, a greater displacement of the top inner ring 10 in axial direction S yields a greater spring force $F_{SPR}$.

A second radial tensile force $F2_{TENS}$ on the outer ring 50 and a second radial compression force $F2_{COMPRESS}$ on the bottom inner ring 30 can be achieved by an upward displacement of the second plurality of rolling elements 60B in a second direction D2 along a second pathway P2 within the bottom raceway 32 (at angle A2) of the bottom inner ring 30 and the first lower raceway 52B (at angle A2) of the outer ring 50. This displacement of the second plurality of rolling elements 60B in the second direction D2 is caused by a displacement of the outer ring 50 in axial direction S. Displacement of the outer ring 50 in this direction moves the plurality of bottom raceways 32 such that a larger effective inner raceway diameter (defined by diameter DM3) converges toward a smaller effective outer raceway diameter (defined by diameter DM4) of the first lower raceways 52B. This convergence, and the magnitude thereof, directly affects a magnitude of the second radial tensile force $F2_{TENS}$ acting on the lower radial inner conical portion 51B of the outer ring 50 and the second radial compression force $F2_{COMPRESS}$ acting on the bottom inner ring 30. Therefore, a greater displacement of the outer ring 50 in direction S yields a greater spring force $F_{SPR}$.

The first and second directions D1, D2 of the respective first and second plurality of rolling elements 60A, 60B can be described as non-parallel; furthermore, the respective first and second pathways P1, P2 can also be described as non-parallel and as converging or forming a "V". Downward displacement of the first plurality of rolling elements 60A in the first direction D1 and upward displacement of the second plurality of rolling elements 60B in the second direction D2 occur when the combustion force $F_{COMB}$ exceeds a force ($F_{PRE}$ or $F_{SPR}$) provided by the rolling element spring 100, causing compression of the rolling element spring 100 and a reduction in the height H of the chamber 88 formed between the top and bottom portions 82, 84 of the piston 80. It could be stated that compression of the rolling element spring 100 causes the first plurality of rolling elements 60A and the second plurality of rolling elements 60B to move closer to each other.

The piston and rolling element spring assembly 200 is subjected to cyclic combustion pressures that can cause cyclic compression and expansion of the rolling element spring 100. Expansion of the rolling element spring 100 can cause the first plurality of rolling elements 60A to move up the first pathway P1 (in a direction opposite D1) and the second plurality of rolling elements 60B to move down the second pathway P2 (in a direction opposite D2). During this expansion of the rolling element spring 100, the first plurality of rolling elements 60A and the second plurality of rolling elements 60B can move away from each other.

It should be noted that the previously described movements of the first plurality of rolling elements 60A and the second plurality of rolling elements 60B can occur in unison. Stated otherwise, the first plurality of rolling elements 60A, which can include one or more rows, typically move or roll together within the described pathways as a group; or, alternatively, all of the rolling elements of the first plurality of rolling elements 60A remain stationary as a group. This movement or non-movement of the first plurality of rolling elements 60 can be separate and distinct from the second plurality of rolling elements 60B which also typically move or roll together within their respective described pathways as a group. Furthermore, the rolling element spring 100 could be designed such that the top inner ring 10 and corresponding first plurality of rolling elements 60A move before movement of the bottom inner ring 30 and second plurality of rolling elements 60B occurs. In such a design, it could be possible that this secondary movement provides a second tier of heightened spring force provided by the rolling element spring 100.

FIG. 10 shows a cross-sectional view taken from FIG. 1 that illustrates an "O arrangement" of the rolling element spring 100. The first and second plurality of rolling elements 60A, 60B are shown in broken lines on the right hand side of FIG. 10 to help show the "O arrangement." First and second contact lines 70A, 70B are shown for the respective balls of the first plurality of rolling elements 60A arranged on opposite upper ends of the cross-sectional of view of FIG. 10. Second and third contact lines 70C, 70D are shown for the respective balls of the second plurality of rolling elements 60B arranged on opposite lower ends of the cross-sectional view of FIG. 10. A first cone C1 is formed by the first and second contact lines 70A, 70B that converge to a first contact line apex 51; and, a second cone C2 is formed by the third and fourth contact lines 70C, 70D that converge to a second contact line apex S2. Both of these cones C1, C2 point axially outward, defining an "O-arrangement".

A wide array of suitable materials and heat treatments for the rolling element spring 100 are possible, including but not limited to various grades of bearing steel and ceramic materials.

The rolling element spring 100 is scalable to many different sizes and load capabilities and is able to provide or generate loads up to 65,000 N with a displacement L that is less than 10 mm. In an example embodiment, the displacement L is between 4 and 6 mm.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A spring configured to compress, expand, and provide a force, the spring comprising:
   a first ring;
   a second ring, at least a portion of the second ring disposed within the first ring;
   a third ring, at least a portion of the third ring disposed within the first ring;
   a first plurality of rolling elements arranged between the at least a portion of the second ring and the first ring; and,
   a second plurality of rolling elements arranged between the at least a portion of the third ring and the first ring.

2. The spring of claim 1, wherein at least one of the first plurality of rolling elements or the second plurality of rolling elements are balls.

3. The spring of claim 2, wherein four contact zones of the balls are defined by: i) an inner raceway of at least one of the second ring or the third ring; and, ii) an outer raceway of the first ring.

4. The spring of claim 1, wherein a first pathway for the first plurality of rolling elements is non-parallel to a second pathway for the second plurality of rolling elements.

5. The spring of claim 1, wherein the first plurality of rolling elements is configured to move toward the second plurality of rolling elements when the spring is compressed from a first height to a second height.

6. The spring of claim 1, wherein a gap is formed between the second ring and the third ring, the gap decreasing when the spring is compressed from a first height to a second height.

7. The spring of claim 1, wherein the first ring is configured with: i) a first conical portion having at least one first raceway to engage the first plurality of rolling elements; and, ii) a second conical portion having at least one second raceway to engage the second plurality of rolling elements.

8. The spring of claim 1, further comprising a cage arranged between the first ring and the second ring, the cage configured to receive the first plurality of rolling elements.

9. The spring of claim 1, wherein:
   the second ring has a first diameter decreasing in magnitude in a first axial direction; and,
   the third ring has a second diameter increasing in magnitude in the first axial direction.

10. A spring configured to compress, expand, and provide a force, the spring comprising:
    a first ring;
    a second ring; at least a portion of the second ring disposed within the first ring;
    a third ring; at least a portion of the third ring disposed within the first ring;
    a first plurality of rolling elements arranged between the at least a portion of the second ring and the first ring;
    a second plurality of rolling elements arranged between the at least a portion of the third ring and the first ring; and,
    compressing the spring: i) moves the first plurality of rolling elements to radially expand the first ring and radially compress the second ring; and, ii) moves the second plurality of rolling elements to radially expand the first ring and radially compress the third ring.

11. The spring of claim 10, wherein contact lines of the first plurality of rolling elements and contact lines of the second plurality of rolling elements form an O-arrangement.

12. The spring of claim 10, wherein:
    the second ring has a first diameter decreasing in magnitude in a first axial direction; and,
    the third ring has a second diameter increasing in magnitude in the first axial direction.

13. The spring of claim 10, wherein:
    the first ring is configured with a first raceway to engage the first plurality of rolling elements and a second raceway to engage the second plurality of rolling elements;
    the second ring is configured with a third raceway to engage the first plurality of rolling elements; and,
    the third ring is configured with a fourth raceway to engage the second plurality of rolling elements.

14. The spring of claim 13, wherein at least one of the first raceway or the second raceway comprises a plurality of grooves.

15. The spring of claim 13, wherein at least one of the third raceway or the fourth raceway comprises a plurality of grooves.

16. A piston for an internal combustion engine, the piston comprising:
    a central axis;
    a top portion configured to receive a force of combustion;
    a bottom portion forming a chamber with the top portion;
    a spring arranged within the chamber and configured to compress or expand to change a compression ratio of the internal combustion engine, the spring comprising:
    a first ring having a first conical portion and a second conical portion;
    a second ring engaging the top portion, at least a portion of the second ring disposed within the first conical portion; and,
    a third ring engaging the bottom portion, at least portion of the third ring disposed within the second conical portion, and
    a first diameter of the first conical portion decreasing in magnitude in a first axial direction; and,
    a second diameter of the second conical portion increasing in magnitude in the first axial direction.

17. The piston of claim 16, further comprising a first plurality of rolling elements arranged between the first ring and the second ring, and a second plurality of rolling elements arranged between the first ring and the third ring.

18. The piston of claim 17, wherein:
    the first ring further comprises:
    a first raceway arranged on the first conical portion; and,
    a second raceway arranged on the second conical portion; and,
    the second ring includes a third raceway; and,
    the third ring includes a fourth raceway; and,
    the first plurality of rolling elements engages the first and third raceways; and,
    the second plurality of rolling elements engages the second and fourth raceways.

19. The piston of claim 18, further comprising a cage arranged between the first ring and the second ring, the cage configured to receive the first plurality of rolling elements.

20. The piston of claim 18, wherein:
    the second ring has a third diameter decreasing in magnitude in the first axial direction; and, the third ring has a second diameter increasing in magnitude in the first axial direction.

\* \* \* \* \*